United States Patent
Gresser, Jr. et al.

[11] Patent Number: 6,167,233
[45] Date of Patent: Dec. 26, 2000

[54] DEVICE FOR RECORDING MULTIPLE DISCRETE MESSAGES FOR A BOOK

[75] Inventors: William Gresser, Jr.; Scott Turner; Ann K. O'Connor; Randall Toltzman, all of Scottsdale, Ariz.; Michael Panson, Pittsburgh, Pa.; Chris Buttenob, Scottsdale, Ariz.

[73] Assignee: Voicemark, LLC, Scottsdale, Ariz.

[21] Appl. No.: 09/144,237

[22] Filed: Aug. 31, 1998

[51] Int. Cl.[7] .............................. G09B 5/00; G09B 5/04
[52] U.S. Cl. .................... 434/308; 434/309; 434/317; 434/319; 434/320
[58] Field of Search ................... 434/308, 309, 434/311, 317, 318, 319, 320

[56] References Cited

U.S. PATENT DOCUMENTS

| | | | |
|---|---|---|---|
| 4,809,246 | 2/1989 | Jeng | 434/317 |
| 4,884,974 | 12/1989 | De Smet | 434/317 |
| 4,990,092 | 2/1991 | Cummings | 434/317 |
| 5,209,665 | 5/1993 | Billings et al. | 434/169 |
| 5,277,452 | 1/1994 | Skidmore | 281/31 |
| 5,520,544 | 5/1996 | Manico et al. | 434/317 |
| 5,531,600 | 7/1996 | Baer et al. | 434/317 |
| 5,577,918 | 11/1996 | Crowell | 434/319 |
| 5,631,883 | 5/1997 | Li | 369/31 |
| 5,761,485 | 6/1998 | Munyan | 395/500 |
| 5,803,748 | 9/1998 | Maddrell et al. | 434/317 |
| 5,878,292 | 3/1999 | Bell et al. | 396/312 |
| 5,903,869 | 5/1999 | Jacobson et al. | 704/272 |
| 5,914,706 | 6/1999 | Kono | 345/173 |

*Primary Examiner*—John Edmund Rovnak
*Attorney, Agent, or Firm*—Jeffrey Weiss; Jeffrey D. Moy; Weiss & Moy, P.C.

[57] ABSTRACT

A recording device that is coupled to a book. The recording device records, saves and plays back a plurality of discrete messages. An archival control disables and enables the device, thus permitting the user to ensure that no new messages will be accidentally recorded over existing saved messages.

25 Claims, 11 Drawing Sheets

DEVICE FOR RECORDING MULTIPLE DISCRETE MESSAGES FOR A BOOK

BACKGROUND OF THE INVENTION

1. Field of the Invention

This invention relates to the field of recording devices, and more particularly, to a device that is attached or incorporated into a book and that records, archives and plays back multiple discrete messages.

2. Description of the Related Art

During the past several years, many new types of electronic products have been developed which are capable of recording and then delivering a non-discrete or single audio message when activated. This technology has been used in conjunction with photo frames, children's books (where pre-recorded messages are generally used) and other products. The use of this technology has allowed one to play pre-recorded discrete messages or a single message or to record generally non-discrete messages associated with a picture or other memorabilia.

For example, U.S. Pat. No. 4,809,246 issued to Jeng discloses a sound illustrated book which identifies the opened page and plays a pre-recorded message related to the particular page. U.S. Pat. No. 5,277,492 issued to Skidmore discloses a photo album which includes a tape player. The tape player allows one to describe the pictures in the photo album rather than give a written description, and to record them in a non-discrete manner; i.e., wherein one recording immediately follows the one before it so that there is no way to listen to a message without listening to or fast-forwarding over all of the messages that came before it.

U.S. Pat. NO. 5,577,918 issued to Crowell discloses a message delivery device which saves a single re-recordable message. The device can also be attached to various products. U.S. Pat. No. 5,520,544 issued to Manico et al. discloses a photo album module that records, stores and plays back audio messages. The device is activated by a plurality of photo detectors mounted in the album cover.

Although the above devices may function adequately for their stated purposes, it is believed that none is a fully satisfactory solution to the need for providing an inexpensive, easy to use message recording device that stores a plurality of messages and may be coupled to a pre-existing books or integrated into a new book. Furthermore, these prior art devices do not fulfill the objective of providing a versatile message recording device that enables and disables the recording function, thus allowing messages to be permanently archived. These prior art devices also do not disclosed a method for recording and archiving a large number of discrete messages, without requiring the construction of an unduly large device not suited for use in conjunction with a book, photo album, or similar object. These devices also do not illustrate an apparatus for efficiently preserving a written record identifying the discrete recorded messages. A need therefore existed for a device that is capable of performing these functions. The present invention answers these needs, and provides other related advantages.

SUMMARY OF THE INVENTION

An object of the present invention is to provide a recording device that couples to a book.

A further object of the present invention is to provide a recording device that couples to a book and that archives a plurality of discrete messages.

It is still a further object of the present invention to provide a recording device that couples to a book and that archives a plurality of discrete messages and which may be readily coupled to an existing book.

It is yet a further object of the present invention to provide a recording device that couples to a book and that archives a plurality of discrete messages and which may be integrated into an existing book.

It is still a further object of the present invention to provide a recording devices that couples to a book, that archives a plurality of discrete messages, and which also allows the user to identify in writing each individual recorded message.

BRIEF DESCRIPTION OF THE PREFERRED EMBODIMENTS

According with the present invention, a device coupled to a book for recording and archiving multiple unique messages is disclosed. The device has a playback and recording means, a memory means for storing a plurality of discrete recorded messages, a message selection means for triggering one of the plurality of discrete message to play or record, an archival control means for enabling and disabling permanent archiving of one or all of the plurality of discrete messages, and an attachment means for coupling the device to a book.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 24b is a perspective view of the recording device of FIG. 24a.

DETAILED DESCRIPTION OF THE PREFERRED EMBODIMENTS

For purposes of describing this invention, the definition of a book includes yearbooks, memory books, scrap books, photo albums, binders, notebooks, folders or other related materials.

Figure 1:
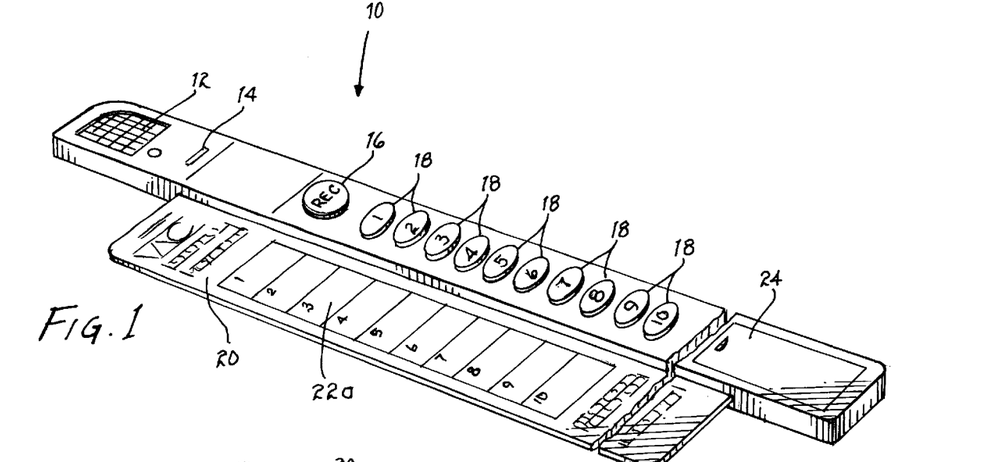
FIG. 1 is a perspective view of a recording device of the present invention that may be attached to a book cover.

Referring now to the drawings, FIG. 1 illustrates a preferred embodiment of a book recorder 10. The book recorder 10 is preferably constructed from a strong plastic material, although other materials may be substituted as desired. The book recorder 10 is preferably of a thin rectangular shape, as shown in FIG. 1.

Figure 7:
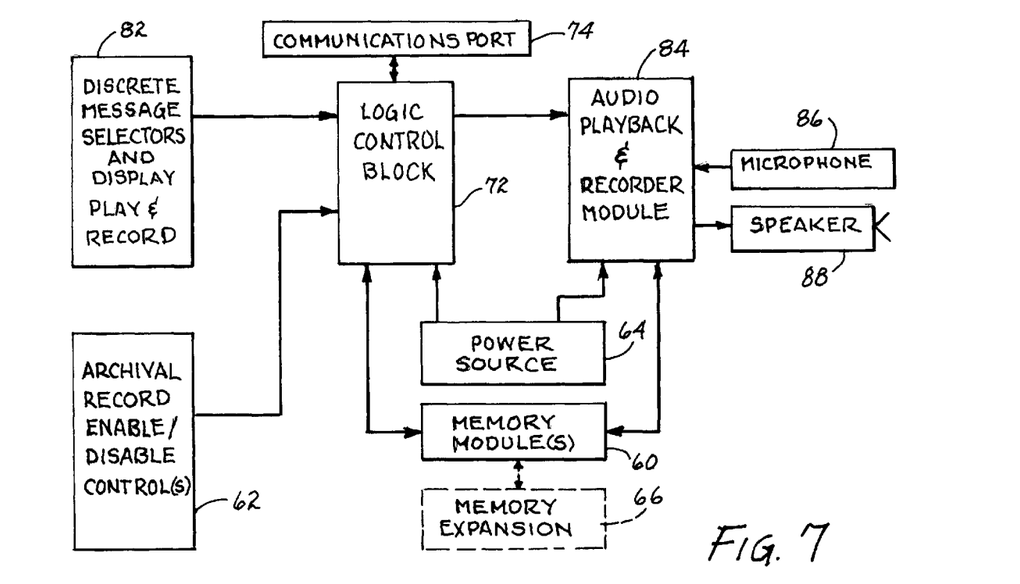
FIG. 7 is a block diagram of the main components of one embodiment of the recording device of the present invention.
Figure 8:
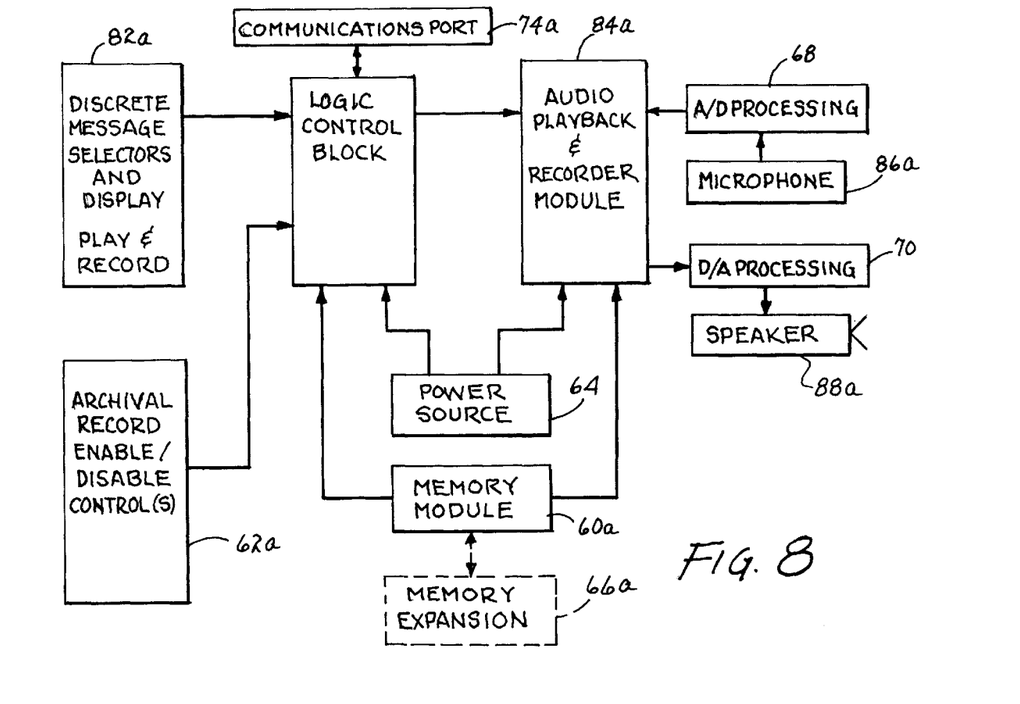
FIG. 8 is a block diagram of the main components of a second embodiment of the recording device of the present invention.
Figure 9:
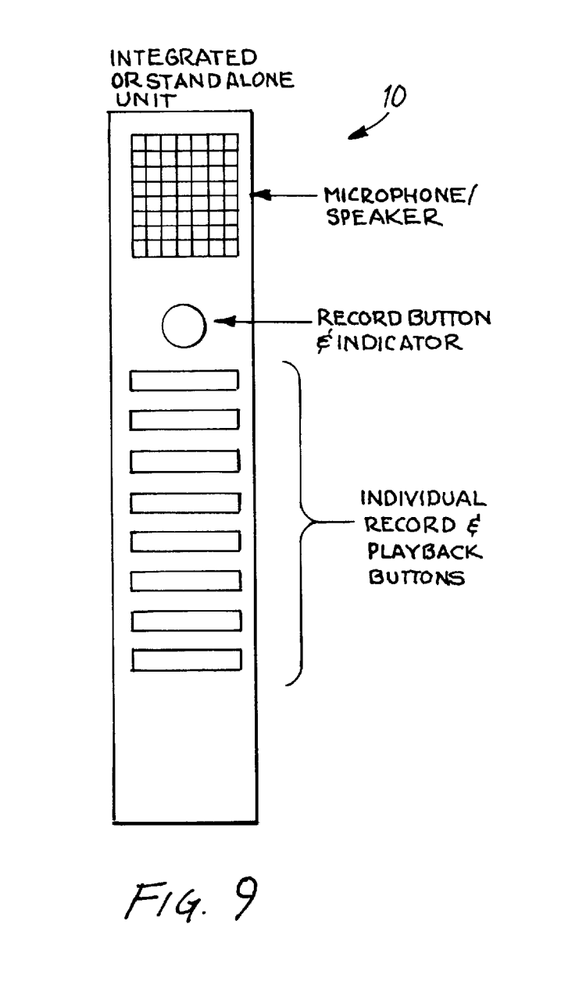
FIG. 9 is a top view of the displayed components of one embodiment of the recording device of the present invention.
Figure 10:
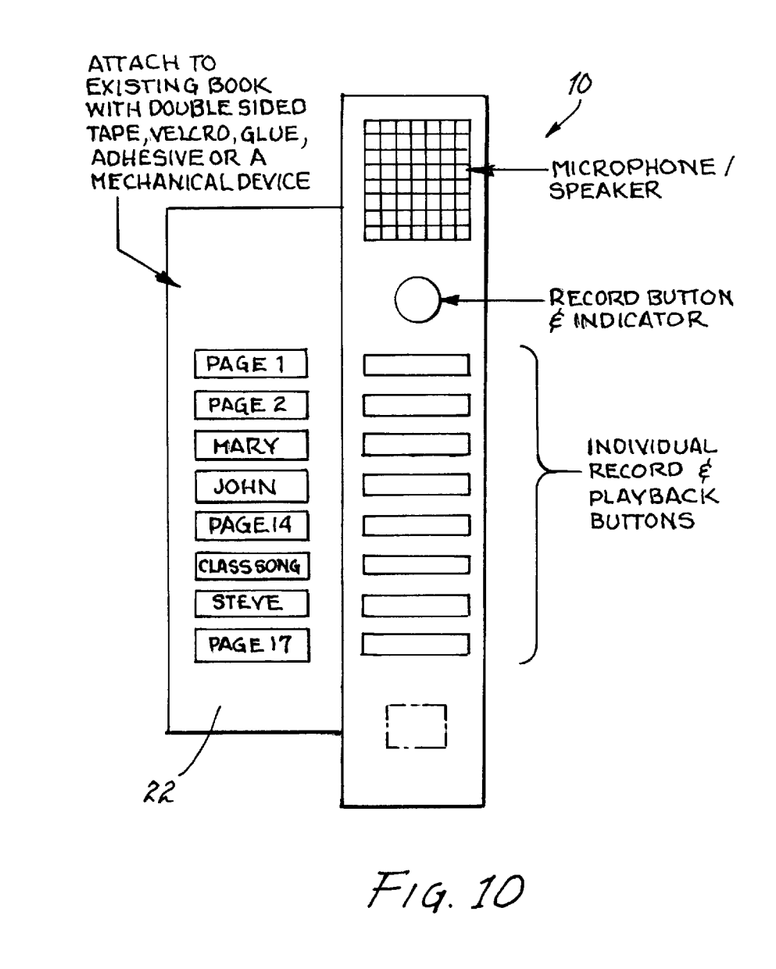
FIG. 10 is a top view of the displayed components of another embodiment of the recording device of the present invention.

A record indicator 16 and a plurality of message indicators 18 are preferably aligned vertically on the face of the book recorder 10, as shown in FIG. 1. The book recorder 10 is activated by selecting first the record indicator 16 and then one of the plurality of message indicators 18. Consequently, the record indicator 16 and the plurality of message indicators 18 are preferably recessed in order to prevent accidental activation of the book recorder 10. (The electrical components of the book recorder 10 are shown in FIGS. 7–8, discussed below.).

Still referring to FIG. 1, after the user selects the record indicator 16 and then one of the plurality of message indicators 18, an audible message may then be spoken into a microphone 14 to record a message. Once the message is completed, the record indicator 16 is selected once more in order to end the recording session. Other discrete messages may also be recorded by again selecting the record indicator 16 and then selecting a different message indicator 18. Furthermore, if the user does not wish to keep one of the recorded messages, a new message may be substituted for an already recorded message by selecting the record indicator 16, selecting the corresponding message indicator 18, and then entering a new message into the microphone 14.

A message may be played back at any time subsequent to the message being recorded. A message is played back by selecting the corresponding message indicator 18 that was used to record the desired message. The selected saved message will then be audibly played back through the speaker 12.

Figure 3:
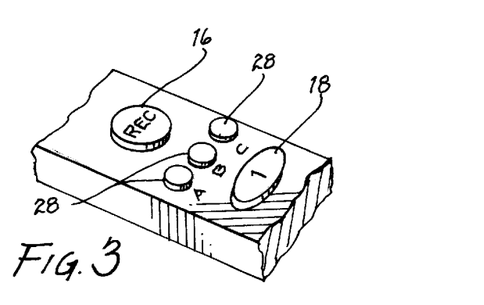
FIG. 3 is a perspective, partially cut-away view of a message indicator multiplier, illustrating another embodiment of the recording device of the present invention.

Another embodiment of the present invention includes a plurality of message multipliers 28, shown in FIG. 3. The message multipliers 28 multiply the number of messages that each message indicator 18 represents. For example, to record a new message, the record indicator 16 is selected followed by one of the message multipliers 28. Next, one of the message indicators 18 is selected and a message is recorded. The saved message then corresponds to the previously selected combination of message multiplier 28 and message indicator 18. Consequently, to play back the recorded message, the same message multiplier 28 is selected with the same message indicator 18. Thus, the purpose of the message multipliers 28 is to save space on the book recorder 10 and to allow the book recorder 10 to be more compact, yet have the ability to save many messages.

Figure 2:
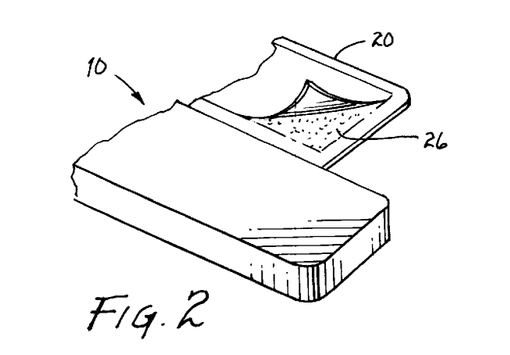
FIG. 2 is a bottom view of the recording device of FIG. 1, showing double sided adhesive tape mounted on the underside of the device.
Figure 4:
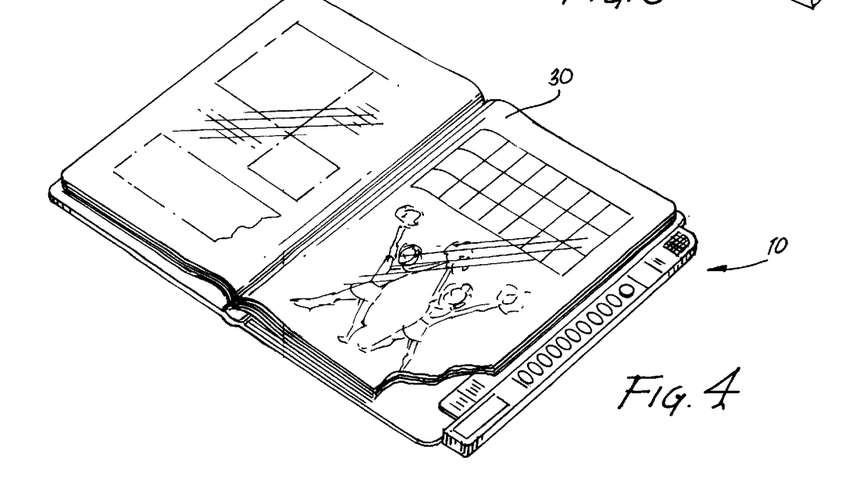
FIG. 4 is a perspective view of the recording device shown in FIG. 1 coupled to a yearbook.
Figure 5:
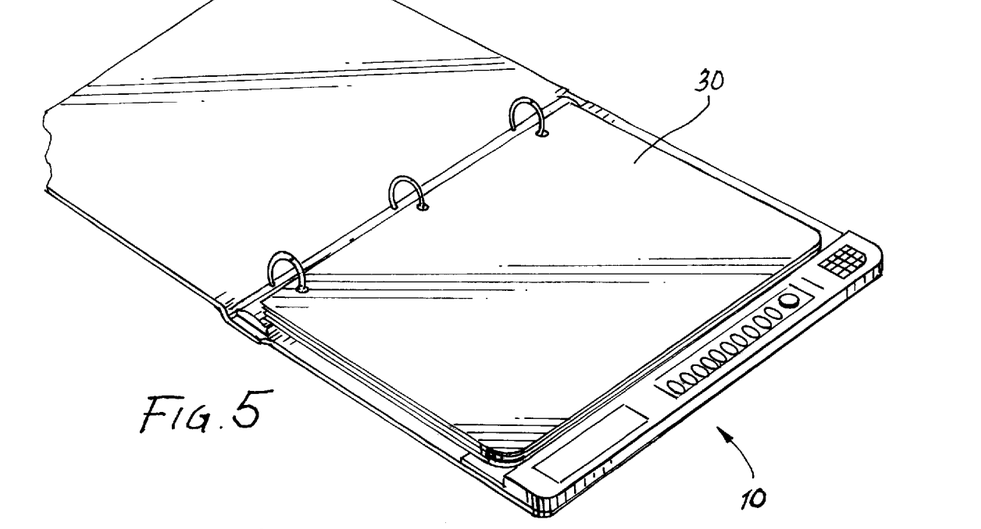
FIG. 5 is a perspective view of the recording device shown in FIG. 1 coupled to a three ring binder.

Preferably, a discrete text label 22, shown in FIGS. 1, 10–14, 19, 24a–b, and 26 is attached to the book recorder 10. The text label 22 is preferably integral to the book recorder 10 of the present invention, and may be located on a reduced thickness extension of the device that extends over the back cover of a book or binder when the book recorder 10 is coupled to the back cover of a book or binder—as shown in FIGS. 1 and 4. As shown in FIG. 2, in this embodiment, an adhesive strip 26 may be coupled to the underside of the book recorder 10 directly below the text label 22, to allow ready adhesion of the book recorder 10 to a book cover. Of course, other adhesion methods may be used, including glue, velcro, clip, etc. The purpose of the text label 22 is to allow the user to write down a brief description of what a corresponding message indicator 18 describes. For example, an individual entry in the text label 22 may describe a page in a book to which the corresponding message indicator 18 refers, or the name of the person who recorded the message. The text label 22 may also take the form of a liquid crystal display, wherein information regarding a corresponding message indicator 18 which is inputted into the book recorder 10 with an appropriate inputting means such as a keypad is displayed.

Figures 11, 12:
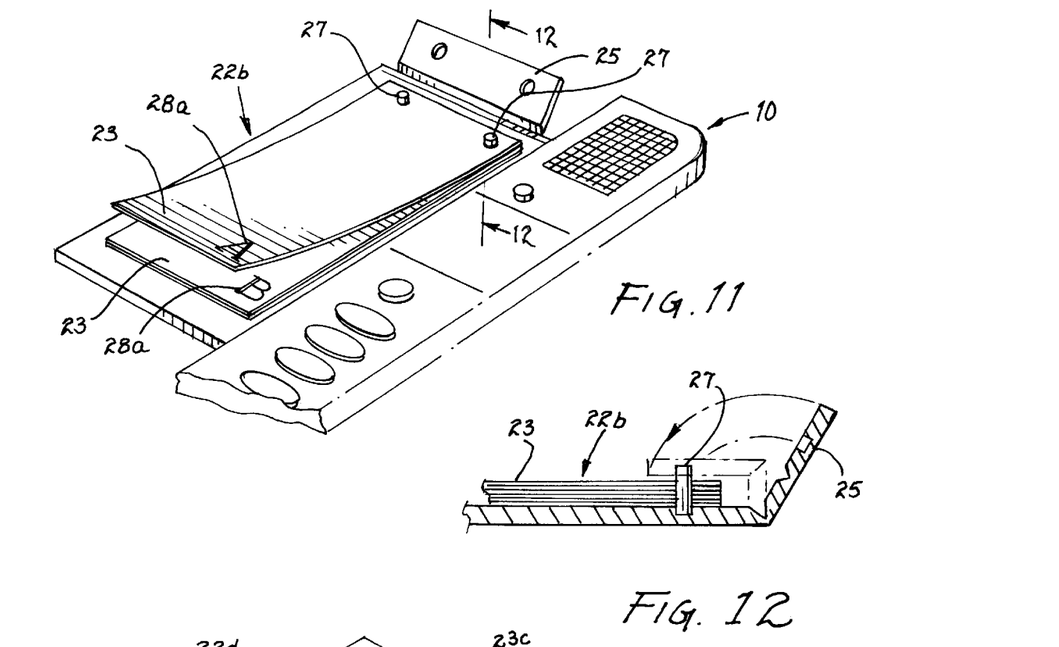
FIG. 11 is a partially cut-away perspective view of the recording device of the present invention, illustrating one structure used for preserving a written record identifying the particular recorded messages.
FIG. 12 is a cross-sectional view of the apparatus of FIG. 11, taken along line 12—12.
Figure 24A:
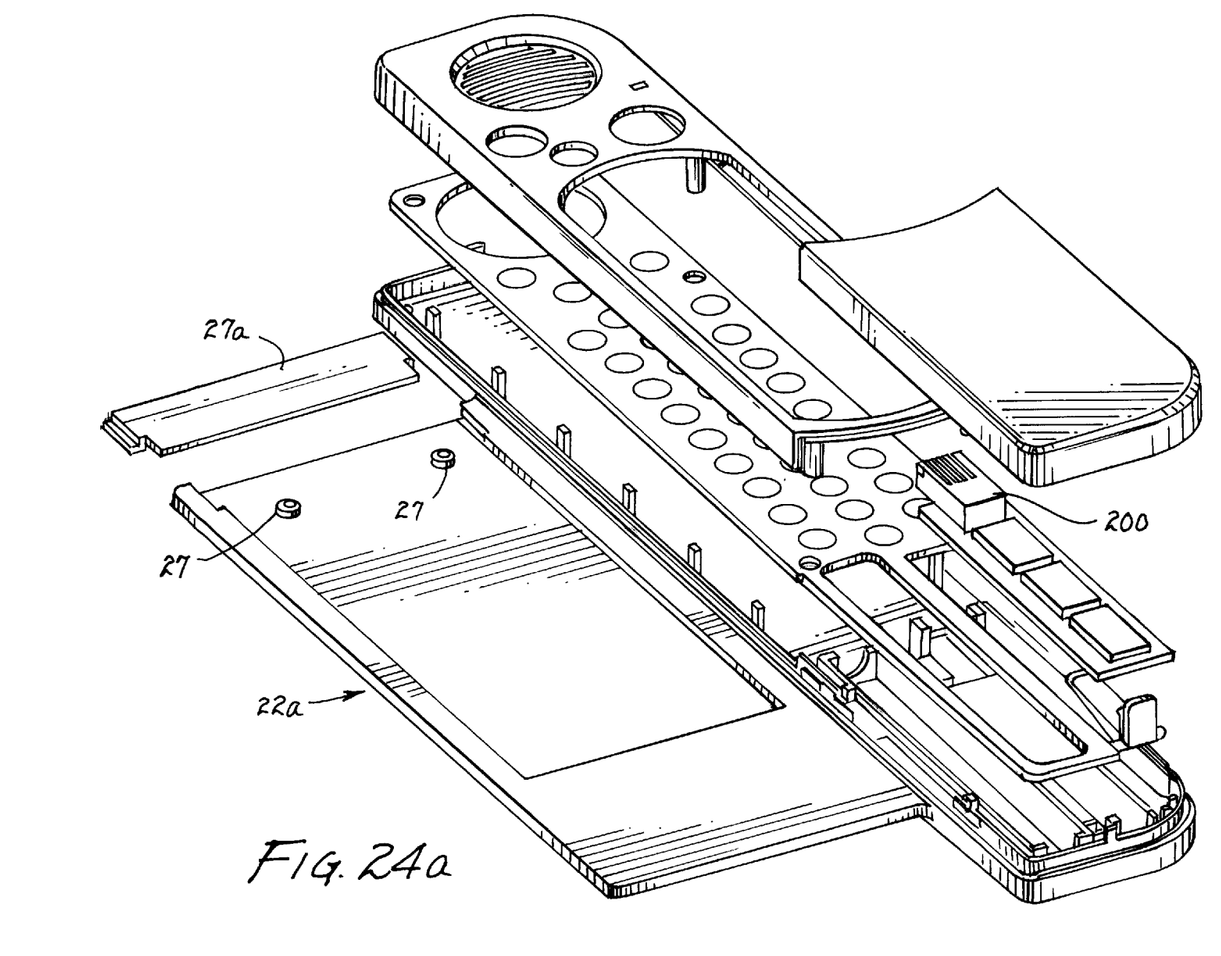
FIG. 24a is an exploded perspective view of the recording device of the present invention, illustrating a structure used for preserving a written record identifying the particular recorded messages.
Figure 24B:
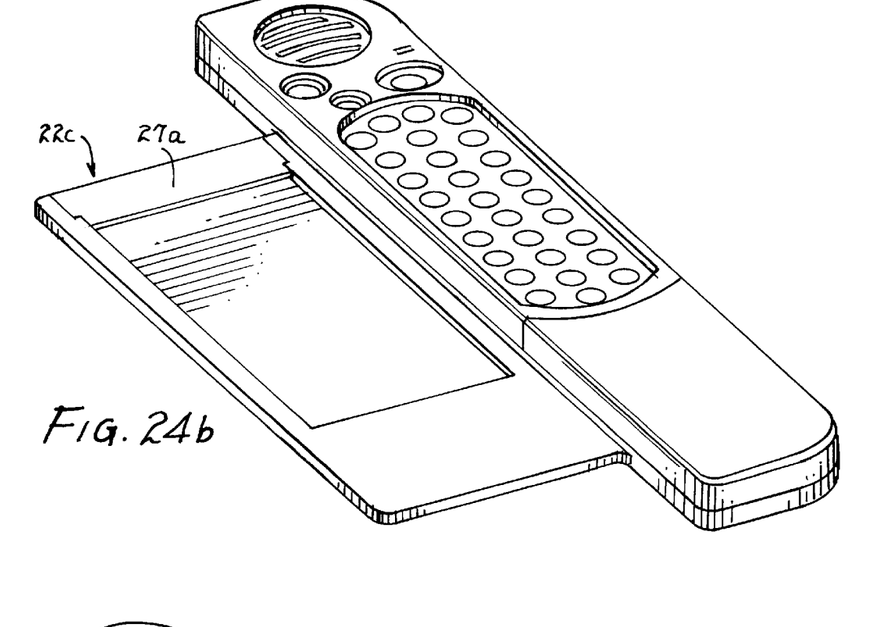
Figure 25:
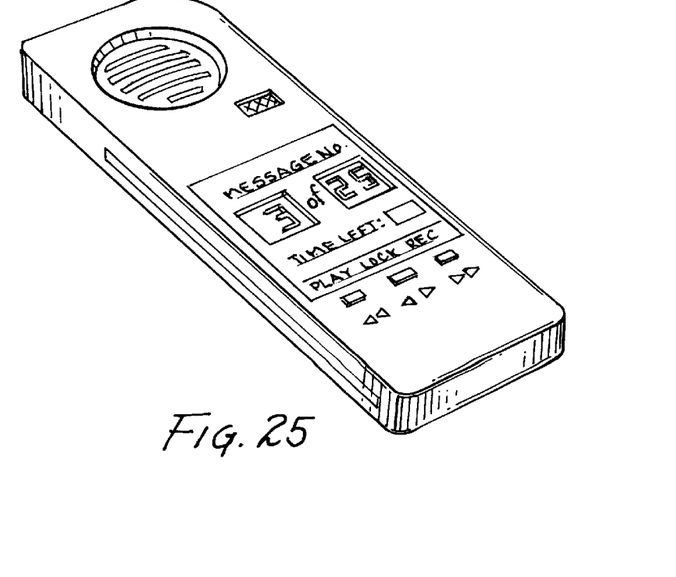
FIG. 25 is a perspective view of another embodiment of the recording device of the present invention, illustrating an LCD-type display.

FIGS. 11–12 show another embodiment of the text label 22, here identified by the reference number 22b. The text label 22b essentially comprises a plurality of two-holed individual sheets 23, which may be added to, removed, or replaced using the bar 25, which snaps onto corresponding posts 27 in the manner shown in FIGS. 11 and 12. Preferably, the number of individual sheets 23 at least corresponds to the number of message multipliers 28, and may exceed that number. In such instance, the individual sheets 23 should bear indicia 28a corresponding to one or more message multipliers 28. Referring now to FIGS. 24a–24b, another embodiment of a holder for the text label 22 is shown, here identified by the reference number 22c. Like the embodiment of FIGS. 11–12, the text label 22b essentially comprises a plurality of two-holed individual sheets (not shown), which are placed over posts 27. A bar 27a is configured, in the manner shown in FIG. 24a, to snap into place over the individual sheets (not shown) and the posts 27 so as to secure the individual sheets (not shown) into position.

Figures 13, 14:
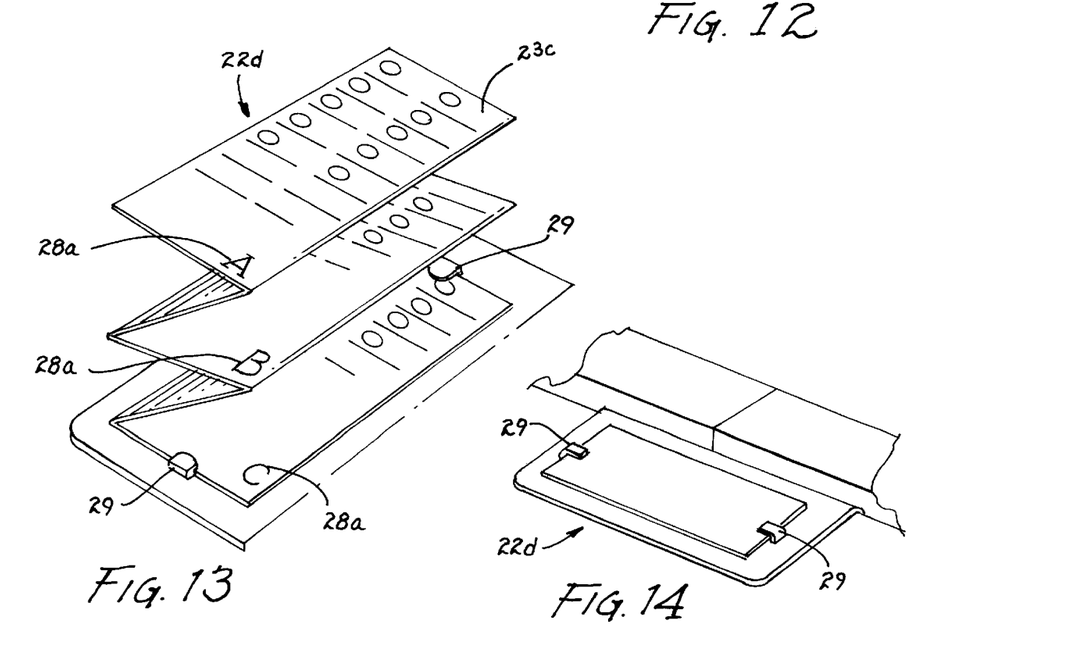
FIG. 13 is a perspective view of a another embodiment of the recording device of the present invention, illustrating another structure used for preserving a written record identifying the particular recorded messages.
FIG. 14 is a partially cut-away perspective view of the structure shown in FIG. 13, illustrating the storage of the accordion-style structure.

Referring now to FIGS. 13 and 14, a text label 22d is shown. The text label 22d is a card or paper 23c that is pre-folded accordion style as shown in FIG. 13. The text label 22d may be stored on the book recorder 10 using prongs 29. When deployed, as shown in FIG. 13, the text label 22c may contain multiple pages upon which information can be written or typed. As discussed above with respect to FIGS. 11–12, there preferably should be at least as many pages in the text label 22c as there are message multipliers 28, as well as indicia 28a to correspond to one or more message multipliers 28.

Figure 6:
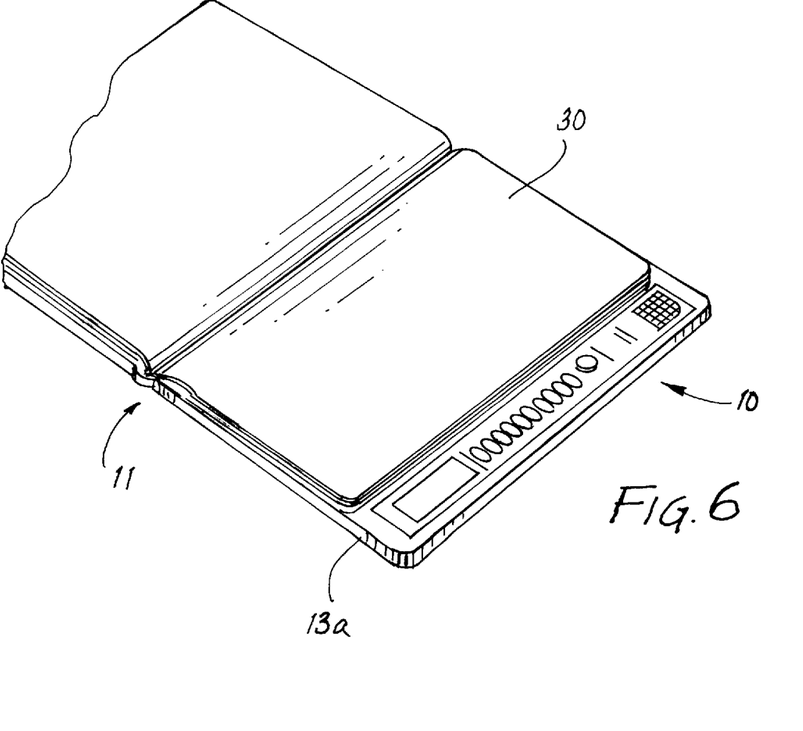
FIG. 6 is a perspective view of another embodiment of the recording device of the present invention, shown integrated into a cover of a book.
Figures 16, 17:
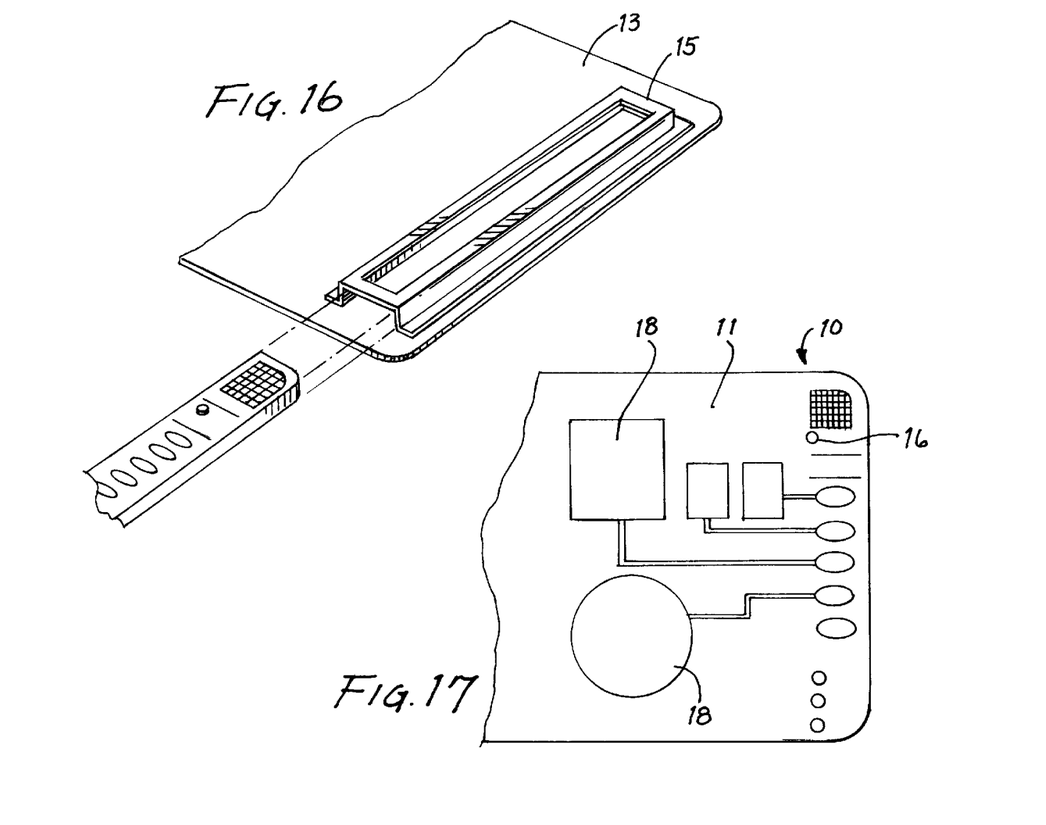
FIG. 16 is a partially cut-away perspective view of the recording device of the present invention, illustrating another method for attaching the recording device to a book.
FIG. 17 is a top, schematic view of the recording device of the present invention, illustrating the use of the present invention with conductive ink.
Figure 18:
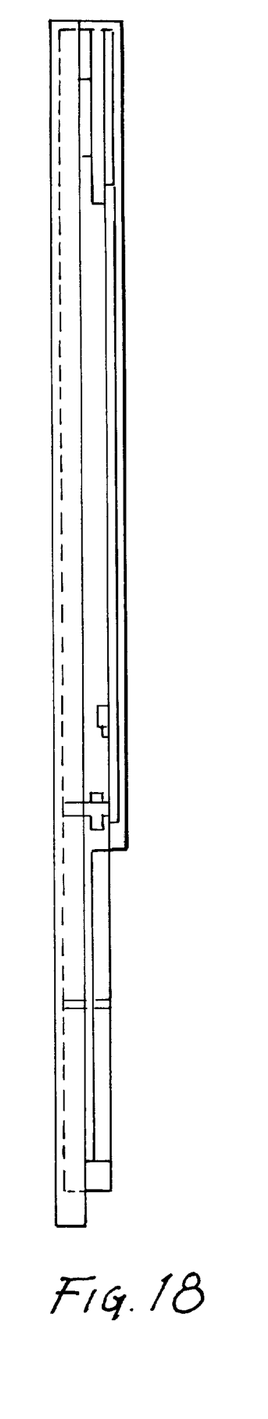
FIG. 18 is a cut-away, side view of the recording device of the present invention shown in FIG. 19.
Figure 19:
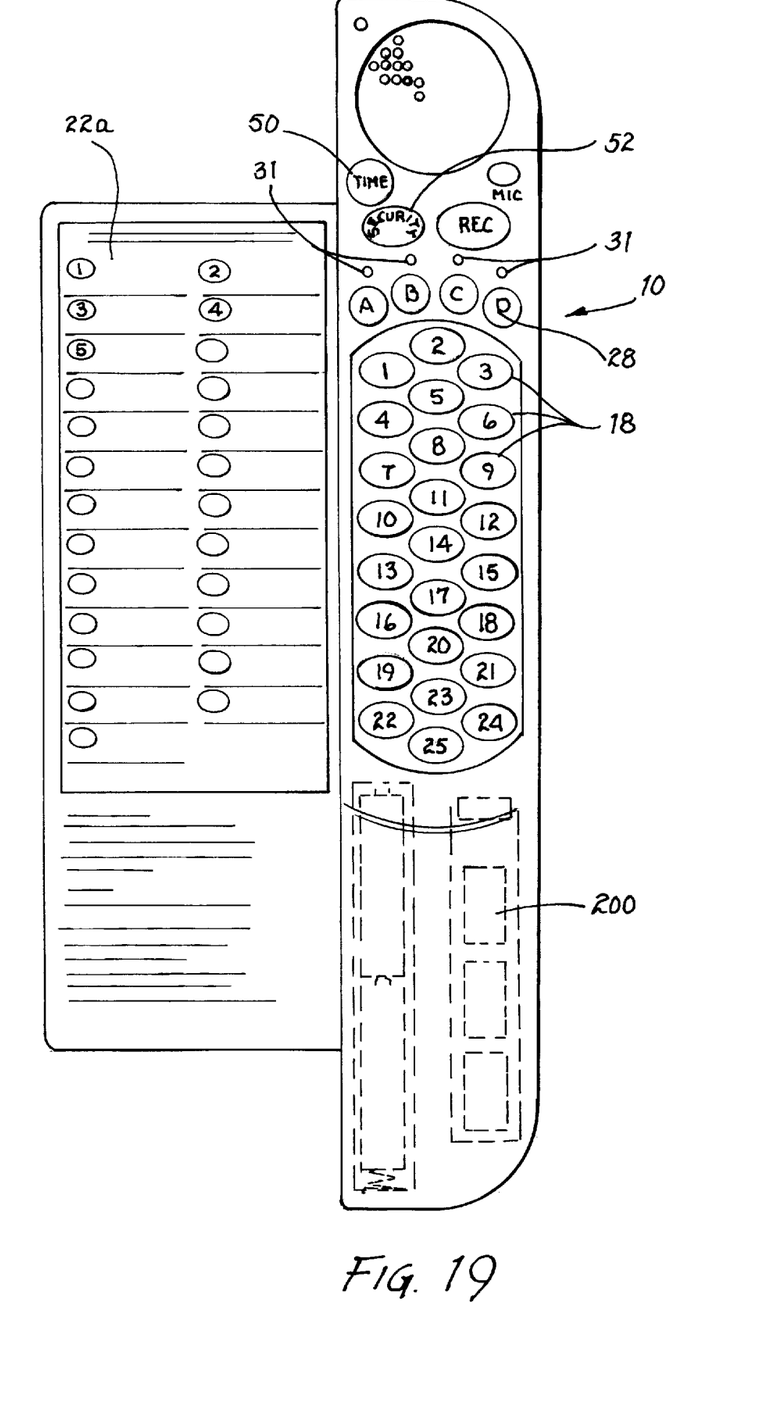
FIG. 19 is a top view of another embodiment of the recording device of the present invention.
Figures 20, 21, 22, 23:
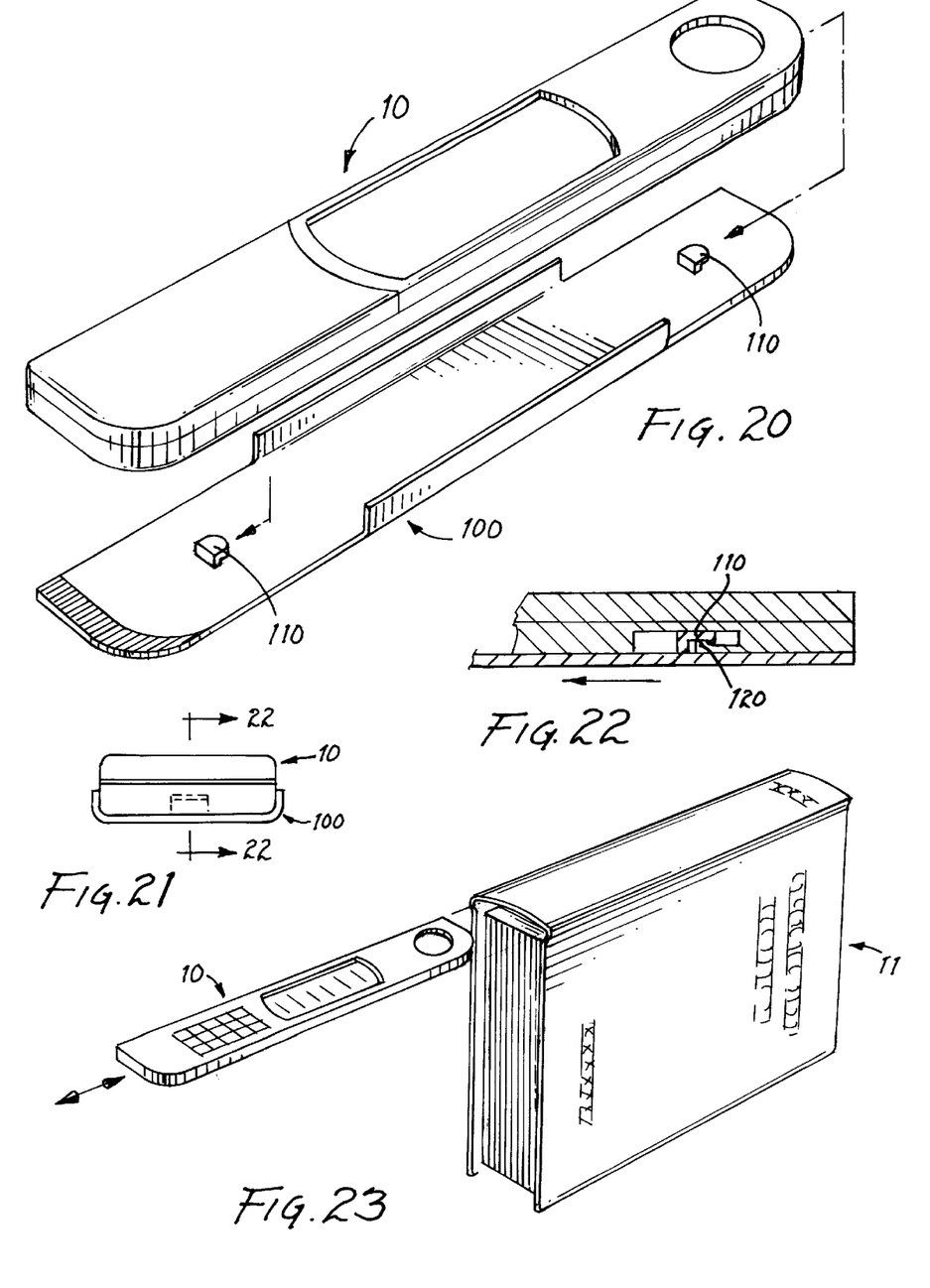
FIG. 20 is a perspective view of the recording device of the present invention, illustrating another method for attaching the recording device to a book.
FIG. 21 is a cross-sectional end view of the recording device attached with the device shown in FIG. 20.
FIG. 22 is a side cross-sectional view of the recording device attached with the device shown in FIG. 20, shown along line 22—22 of FIG. 21.
FIG. 23 is a perspective view of the recording device of the present invention, illustrating another method for attaching the recording device to a book.
Figure 26:
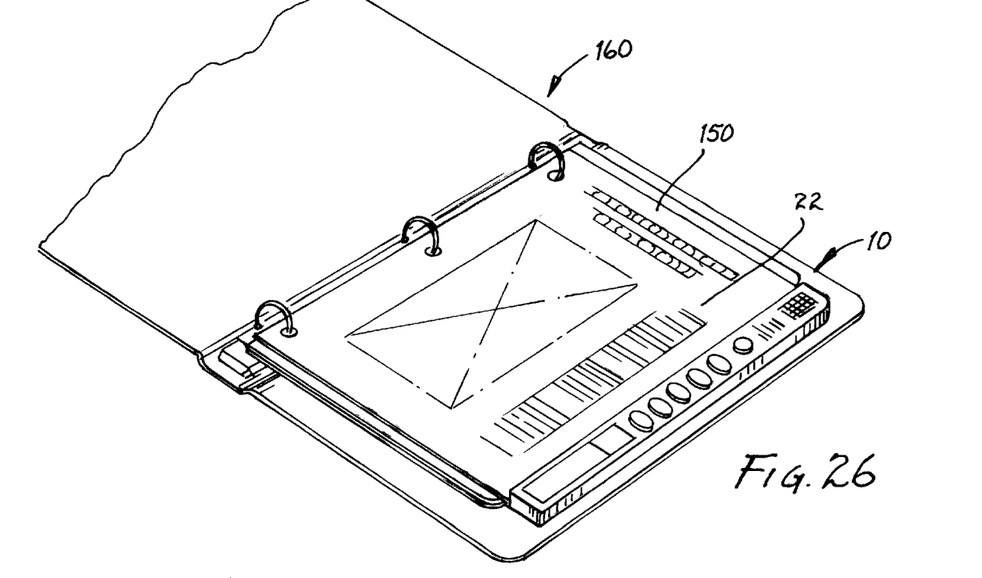
FIG. 26 is a perspective view of the recording device of the present invention, illustrating another method for attaching the recording device to a binder-type book.
Figure 26A:
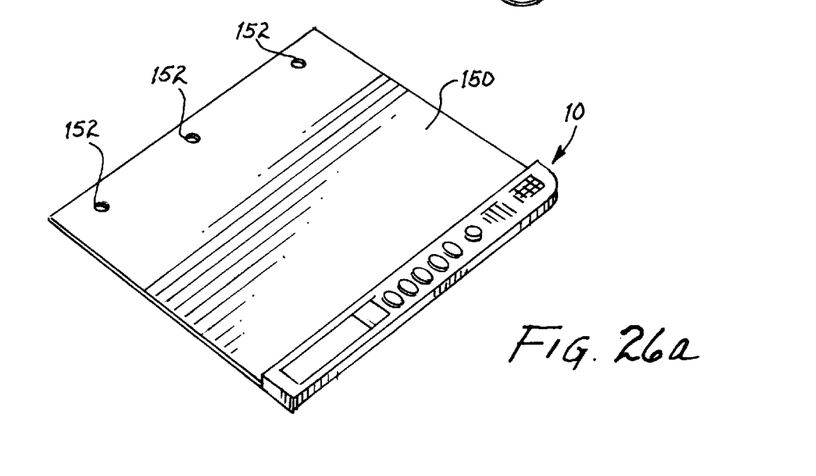
FIG. 26a is a perspective view of the recording device of FIG. 26, shown prior to attachment to a binder-type book.

Other methods of attaching or incorporating the book recorder 10 to a book are shown in FIGS. 6, 16–17, 20–23, and 26–26a. Referring first to FIG. 6, the book recorder 10 may be directly attached to an extended back cover 13a of a book 11, by adhesive tape, glue, screws or other adhering method, so that the entire book recorder 10 rests on the inside of the back cover 13a. Referring now to FIG. 16, the book recorder 10 may be inserted into a sleeve 15 located on a back cover 13, which is dimensioned as shown in FIG. 16 to permit full access to the face of the book recorder 10—yet also to allow removal of the book recorder 10 for purposes of using the recorder separately from the book, adding memory, changing the batteries, or repairing or replacing the book recorder 10. Referring now to FIGS. 20–22, the book recorder 10 may be removably coupled to a base 100, which base 100 would in turn be secured to the extended back cover 13a of a book 11. The base 100 has mounted thereon two strongs 110, which connect with corresponding detents 120 located on the base of the book recorder 10 in the manner shown in FIG. 22 to secure the book recorder 10 in position. Referring now to FIGS. 26–26a, the book recorder 10 may be coupled or attached to a sheet 150, which sheet 150 has a plurality of openings 152 to correspond to the number and placement of rings on a ring-type binder 160, so as to permit removable attachment of the sheet 150 and book recorder 10 to the binder 160. (The sheet 150 may also be used to store text information, as described above for example with respect to FIGS. 1, 10–14, 19, and 24a–24b.).

Referring now to FIG. 17, another embodiment of the book recorder 10 is shown. Here, the message indicators 18 are coupled to the book recorder 10 using conductive ink, so that a message may be recorded directly corresponding to an image in the book 11. In this embodiment, the message indicators 18 would be dispersed throughout the book 11.

Referring now to FIG. 23, the book recorder 10 may be inserted into the spine of a book 11. In this embodiment, either the entire book recorder 10 may be inserted into the spine of the book 11, or only those portions of the book recorder 10 that are not required to be seen by a user during use of the book recorder 10 may be inserted into the spine of the book 11, while those required to be viewed by the user—e.g., the message indicators 18, microphone 14, and speaker 12—would be displayed on the back cover of the book in a second book recorder 10 lacking those components, wherein the two book recorders 10 would be coupled with wires or conductive ink.

Referring now to FIG. 19, a memory available function 50 may be included on the book recorder 10. When the memory available function 50 is activated by pressing the button labelled "TIME," the book recorder 10 will audibly state the amount of recording/save time available in the book recorder's memory module 60 or 60a (see FIGS. 7 and 8).

Figure 15:
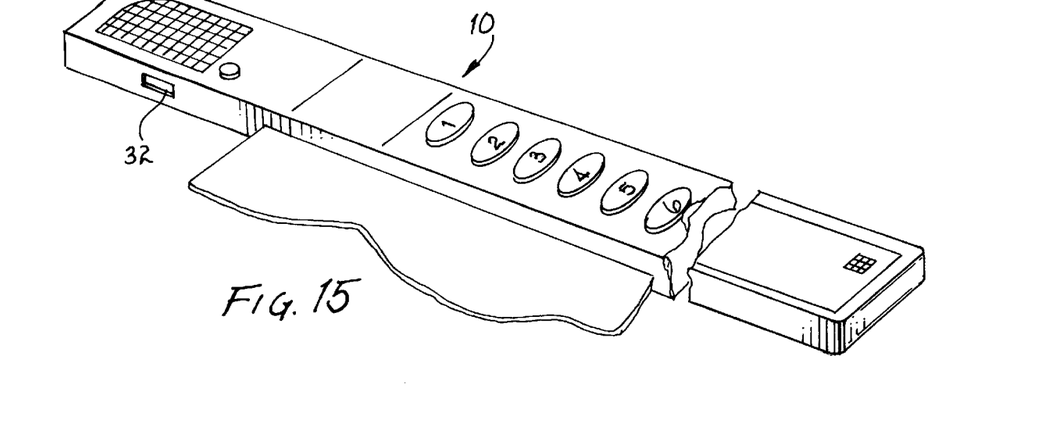
FIG. 15 is a partially cut-away perspective view of the recording device of the present invention, illustrating an archiving feature.

Referring to FIG. 15, a general archival control 32 is shown. The general archival control 32 allows a user to enable and disable all of the message indicators 18. Thus, messages may be permanently saved by selecting the general archival control 32 which causes the recording indicator 16 (see FIG. 1) to become disabled, thus preventing the accidental recording over of a previously recorded message. The archival control means 32 may again be selected to re-enable the recording indicator 16. The general archival control 32 is preferably recessed in the housing of the book recorder 10 as shown in FIG. 15, to minimize the possibility that it will be pressed accidentally. (Alternatively, the general archival control 32 may be placed, for example, within the battery compartment 24 (shown in FIG. 1)).

Referring now to FIG. 19, a discrete archival record enable/disable control 62/62a (see FIGS. 7–8) is shown, for use with a message multiplier 28. To activate the archival record enable/disable control 62 or 62a using the embodiment of FIG. 19, a user would first depress the SECURITY button 52, followed by the appropriate message multiplier 28 and, optionally, a message indicator 18. If the user depresses only the SECURITY button 52 and one message multiplier 28, then all of the messages on that multiplier are archived. For example, if the user depresses the SECURITY button 52 followed by the message multiplier 28 designated by the letter "D", then messages D1–D25 would be archived. A repeat of that operation would de-activate the archival record enable/disable control 62 or 62a. (LED indicators 31 corresponding to each of the message multipliers 28 alert the user when a message multiplier 28 has been depressed.) Alternatively, and still referring to FIG. 19, a user may archive a single message by depressing the SECURITY button 52, followed by a message multiplier 28, followed by a message indicator 18. For example, if the user depresses the SECURITY button 52 followed by the message multiplier 28 designated by the letter "D" and then followed by the message indicator 18 designated by the number "3", then message D3 would be archived. A repeat of that operation would de-activate the archival record enable/disable control 62 or 62a. Preferably, the logic control block 72/72a (see FIGS. 7–8) is programmed to indicate audibly with a voice prompt when a message(s) has been archived with a word such as "LOCKED," and to indicate that a message(s) has been unarchived with a word such as "UNLOCKED."

Referring to FIGS. 7–8, the electronic operation of the book recorder is shown. The discrete message selectors and display 82, 82a, provide input and output for the user. The logic control block 72, 72a acts on selections made by the discrete message selectors and display 82, 82a and controls the display therein to provide feedback to the user. (The logic control block 72a preferably includes a compression and expansion algorithm. The compression and expansion algorithm optimizes the storage of saved messages, thereby allowing more message time to be saved on the book recorder 10.) The archival record enable/disable control(s)

62, 62a provides a setting to the logic control block 72, 72a to disable or enable further recording to a message. The memory module(s) 60, 60a provide storage for messages to the audio playback and recorder module 84, 84a which plays back messages stored in or records messages to the memory modules 60, 60a. Because the book recorder 10 may be used for memorabilia, such as photo albums or yearbooks, the recorded messages need to be saved for a substantial period of time. Therefore, in order to ensure longevity of the messages, the memory modules 60, 60a would preferably be non-volatile so as to preserve all of the previously saved messages, even if an interruption in the power supply from the power source 64 occurred.

The memory expansion 66, 66a provides a way to connect additional storage to allow longer messages or a greater quantity of messages than is available from the built-in memory modules 60, 60a. This would permit the addition of memory 200 (see FIGS. 19, 24a) to increase the amount of available message time. The additional memory 200 could be inserted into the book recorder 10 in the manner shown in FIGS. 19 and 24a. The power source 64 provides power to the system, which can be either battery power or an external input device.

The input to the recorder in the audio playback and recorder module 84, 84a can be provided by a microphone (or other audio input) B6, 86a directly as shown in FIG. 7 such as possible for an analog memory storage, or pre-processed by an A/D processing block 68 as shown in FIG. 8, to provide conversion for digital storage and pre-processing and/or amplification of the audio signal.

The output from the playback in the audio playback and recorder module 84, 84a can be direct to a speaker 88, as shown in FIG. 7, or post-processed by a D/A processing 70, as required for digital memory, as shown in FIG. 8, before entering a speaker 88a.

A communications port 74, 74a provides a means for uploading and downloading messages from the memory modules 60, 60a and any memory connected to the memory expansion 66, 66a. This allows an external unit to transfer messages into the memory or out of memory for other purposes such as use on a personal computer or over the Internet. For example, the messages saved on the book recorder 10 may be uploaded and saved onto a computer (not shown), or a recorded message from a computer (e.g., a school fight song) could be downloaded onto the book recorder 10. This communications port 74, 74a may also control playback or storage of samples via the audio playback and recorder module 84, 84a by remotely directing the logic control block 72, 72a to initiate playback or recording of the message.

While the invention has been described with reference to particularly preferred embodiments, it will be apparent that various modifications can be made without departing from the spirit of the invention. Such modifications are intended to fall within the scope of the appended claims.

What is claimed is:

1. A device for recording and archiving multiple discrete messages comprising, in combination:
   playback and recording means for recording and playing back a plurality of discrete messages;
   wherein said playback and recording means further comprises a message indicator adapted to play back said plurality of discrete messages and a record indicator adapted to record said plurality of discrete messages;
   memory means coupled to said playback and recording means for storing said plurality of discrete messages;
   message selection means coupled to said memory means for causing one of said plurality of discrete messages to play or record;
   discrete archival control means coupled to each of said memory means and said record indicator for enabling and disabling said record indicator; and
   attachment means for coupling said device to a book.

2. A device in accordance with claim 1 further comprising:
   analog to digital converter means coupled to an input of said playback and recording means for converting an audio signal from analog to digital; and
   digital to analog converter means coupled to an output of said playback and recorder means for converting an audio signal from digital to analog.

3. A device in accordance with claim 1 wherein said memory means further comprises:
   memory expansion means for increasing the amount of available memory.

4. A device in accordance with claim 1 wherein said memory means further comprises a compression algorithm means for optimizing memory space.

5. A device in accordance with claim 1 wherein said memory means is non-volatile.

6. A device in accordance with claim 1 wherein said archival control means comprises means for selectively preventing the recording of a group consisting of at least one but less than all of said plurality of discrete messages.

7. A device in accordance with claim 1 wherein said archival control means comprises means for preventing the recording of all of said plurality of discrete messages.

8. A device in accordance with claim 7 wherein said archival control means is recessed into a surface of said device.

9. A device in accordance with claim 1 wherein said message selection means comprises:
   a plurality of discrete message indicator means for selecting a particular discrete message.

10. A message selection means in accordance with claim 9 wherein said plurality of message indicators are displayed on a liquid crystal display.

11. A device for recording and archiving multiple discrete messages comprising, in combination:
    playback and recording means for recording and Playing back a plurality of discrete messages;
    memory means coupled to said playback and recording means for storing said plurality of discrete messages;
    message selection means coupled to said memory means for causing one of said plurality of discrete messages to play or record;
    wherein said message selection means comprises a plurality of discrete message indicator means for selecting a particular discrete message;
    wherein said message selection means further comprises a message indicator multiplier means for multiplying by at least two the number of discrete messages that each of said plurality of discrete message indicator means represents;
    archival control means coupled to each of said memory means and said playback and recording means for enabling and disabling said playback and recording means; and
    attachment means for coupling said device to a book.

12. A device in accordance with claim 9 wherein said plurality of message indicator means are comprised of a contact point coupled to conductive ink.

13. A device in accordance with claim 1 wherein said message selection means further comprises a memory available means for audibly indicating the amount of recording time left in said memory means.

14. A device in accordance with claim 1 further comprising identifying means for identifying each of said plurality of discrete messages.

15. A device for recording and archiving multiple discrete messages comprising, in combination:
  playback and recording means for recording and playing back a plurality of discrete messages;
  memory means coupled to said playback and recording means for storing said plurality of discrete messages;
  message selection means coupled to said memory means for causing one of said plurality of discrete messages to play or record;
  wherein all of said message selection means occupy a first discrete surface area on said device;
  archival control means coupled to each of said memory means and said playback and recording means for enabling and disabling said playback and recording means;
  attachment means for coupling said device to a book; and
  identifying means for identifying each of said plurality of discrete messages;
  wherein said identifying means comprises a writing platform located on a second discrete surface area on said device; and
  wherein said identifying means further comprises at least one writing surface attached to said writing platform.

16. A device for recording and archiving multiple discrete messages comprising, in combination:
  playback and recording means for recording and playing back a plurality of discrete messages;
  memory means coupled to said playback and recording means for storing said plurality of discrete messages;
  message selection means coupled to said memory means for causing one of said plurality of discrete messages to play or record;
  wherein said message selection means comprises a plurality of discrete message indicator means for selecting a particular discrete message;
  wherein said message selection means further comprises a message indicator multiplier means for multiplying by at least two the number of discrete messages that each of said plurality of discrete message indicator means represents;
  archival control means coupled to each of said memory means and said playback and recording means for enabling and disabling said playback and recording means;
  attachment means for coupling said device to a book; and
  identifying means for identifying each of said plurality of discrete messages:
  wherein said identifying means comprises at least one writing surface removably attached to said device; and
  wherein said identifying means further comprises at least one writing surface corresponding to each of said message indicator multiplier means.

17. A device in accordance with claim 1 wherein said attachment means comprises means for recessing at least a portion of said device into a back cover portion of said book.

18. A device in accordance with claim 1 wherein said attachment means comprises means for recessing at least a portion of said device into a binding portion of said book.

19. A device in accordance with claim 1 wherein said attachment means comprises at least one of an adhesive and hook and loop material.

20. A device in accordance with claim 1 wherein said attachment means comprises means for slidably retaining said device to said book.

21. A device in accordance with claim 1 wherein said attachment means comprises means for removably locking said device to said book.

22. A device for recording and archiving multiple discrete messages comprising, in combination:
  a support structure;
  playback and recording means for recording and playing back a plurality of discrete messages;
  memory means coupled to said playback and recording means for storing said plurality of discrete messages;
  message selection means coupled to said memory means for causing one of said plurality of discrete messages to play or record;
  archival control means coupled to each of said memory means and said playback and recording means for enabling and disabling said playback and recording means;
  wherein each of said playback and recording means, said memory means, said message selection means and said archival control means is located on said support structure; and
  attachment means for coupling said support surface to a book;
  wherein said attachment means comprises a plurality of apertures in said support structure dimensioned to be received within ring portions of a ring-type binder.

23. A device in accordance with claim 6 further comprising means for audibly alerting a user that at least one of said plurality of discrete messages has been archived.

24. A device in accordance with claim 1 further comprising means for recording, storing and playing back said plurality of discrete messages in analog form.

25. A device for recording and archiving multiple discrete messages comprising, in combination:
  playback and recording means for recording and playing back a plurality of discrete messages;
  memory means coupled to said playback and recording means for storing said plurality of discrete messages;
  message selection means coupled to said memory means for causing one of said plurality of discrete messages to play or record;
  wherein all of said message selection means occupy a first discrete surface area on said device;
  archival control means coupled to each of said memory means and said playback and recording means for enabling and disabling said playback and recording means; and
  identifying means for identifying each of said plurality of discrete messages;
  wherein said identifying means comprises a writing platform located on a second discrete surface area on said device; and
  wherein said identifying means further comprises at least one writing surface attached to said writing platform.

* * * * *